US011117133B2

(12) United States Patent
Kizil et al.

(10) Patent No.: US 11,117,133 B2

(45) Date of Patent: Sep. 14, 2021

(54) MICROFLUIDIC SYSTEM FOR CANCER CELL SEPARATION, CAPTURING AND DRUG SCREENING ASSAYS

(71) Applicant: ISTANBUL TEKNIK UNIVERSITESI, Istanbul (TR)

(72) Inventors: Huseyin Kizil, Istanbul (TR); Emre Altinagac, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 168 days.

(21) Appl. No.: 16/623,777

(22) PCT Filed: Aug. 17, 2018

(86) PCT No.: PCT/TR2018/050436

§ 371 (c)(1),
(2) Date: Dec. 18, 2019

(87) PCT Pub. No.: WO2019/125333

PCT Pub. Date: Jun. 27, 2019

(65) Prior Publication Data

US 2020/0139369 A1 May 7, 2020

(30) Foreign Application Priority Data

Aug. 23, 2017 (TR) ................................ 2017/12622

(51) Int. Cl.

*B01L 3/00* (2006.01)
*G01N 35/00* (2006.01)
(Continued)

(52) U.S. Cl.

CPC ... *B01L 3/502761* (2013.01); *B01L 3/502746* (2013.01); *B03C 5/005* (2013.01);
(Continued)

(58) Field of Classification Search

CPC ................ B01L 3/502761; B01L 3/00; B01L 3/502746; B01L 2200/0647; B01L 3/50; G01N 35/00; B03C 5/005; B03C 5/026
See application file for complete search history.

(56) References Cited

U.S. PATENT DOCUMENTS

2002/0088712 A1* 7/2002 Miles ............... B01L 3/502761 204/547
2004/0011650 A1 1/2004 Zenhausern et al.
(Continued)

FOREIGN PATENT DOCUMENTS

CN 103630579 A 3/2014
EP 1645621 A1 4/2006
(Continued)

*Primary Examiner* — Brian J. Sines

(74) *Attorney, Agent, or Firm* — Bayramoglu Law Offices LLC

(57) ABSTRACT

A microfluidic system which enables singular confinement of cells at the capturing stations and impedance measurements of single cells at these stations. The microfluidic system includes an inlet, a dielectrophoretic separation site, a waste outlet I, a connection pad, a hydrodynamic flow resistance. Collective measurements can also be obtained by measuring up to twenty singular cells at capturing stations simultaneously.

4 Claims, 5 Drawing Sheets

(51) Int. Cl.
*B03C 5/00* (2006.01)
*B03C 5/02* (2006.01)

(52) U.S. Cl.
CPC ....... *B03C 5/026* (2013.01); *B01L 2200/0647* (2013.01); *B01L 2300/0645* (2013.01); *B01L 2400/084* (2013.01); *B03C 2201/18* (2013.01)

(56) References Cited

U.S. PATENT DOCUMENTS

| | | | | |
|---|---|---|---|---|
| 2004/0197899 | A1* | 10/2004 | Gomez | G01N 33/56911 435/287.2 |
| 2012/0058504 | A1 | 3/2012 | Li et al. | |
| 2012/0085649 | A1 | 4/2012 | Sano et al. | |
| 2016/0299138 | A1* | 10/2016 | Almasri | B01L 3/502761 |

FOREIGN PATENT DOCUMENTS

| | | | |
|---|---|---|---|
| KR | 101229481 | B1 | 2/2013 |
| KR | 20160057280 | A | 5/2016 |
| WO | 2012110922 | A1 | 8/2012 |
| WO | 2017040995 | A1 | 3/2017 |

* cited by examiner

MICROFLUIDIC SYSTEM FOR CANCER CELL SEPARATION, CAPTURING AND DRUG SCREENING ASSAYS

CROSS REFERENCE TO THE RELATED APPLICATIONS

This application is the national phase entry of the International Application No. PCT/TR2018/050436, filed on Aug. 17, 2018, which is based upon and claims priority to Turkish Patent Application No. 2017/12622, filed on Aug. 23, 2017, the entire contents of which are incorporated herein by reference.

TECHNICAL FIELD

The invention is related with a microfluidic system which enables singular confinement of cells at the capturing stations and impedance measurements of single cells at these stations. Collective measurements can also be obtained by measuring up to twenty singular cells at capturing stations simultaneously.

The invention is more specifically related with a microfluidic system which enables sorting cancer cells flowing in a medium in the microchannel under applied electric field by means of dielectrophoresis owing to cells' different dielectric property. Sorted cells are captured at capturing stations by hydrodynamic forces and impedance measurements of the captured cells are recorded.

BACKGROUND

Flow in microfluidic systems at the desired flow rates is generally obtained with pumps or pressure control systems. It is possible to sort the cells in the fluid carrier liquid only according to their sizes with the effect of the flow hydrodynamics. Sorted different sized cells can be trapped individually at stations by means of physical barriers placed on the flow line such as a wall, bump, well or hole. Hydrodynamic cell capturing methods can be divided into two as vertical and horizontal systems in which the cells are individually captured, respectively vertical or parallel to the flow in the microchannel. Vertical cell capturing systems capture cells individually at the micro wells located on the base of the microfluid system. The cells may settle freely into the micro wells under the gravitational force, or the process can be accelerated by means of centrifuge.

The horizontal cell capturing systems capture cells between the barriers placed on the flow line. Capturing cells is possible between the bumps placed successively and in a certain order throughout the microchannel. However, the efficiency of cell capturing by hydrodynamics is very low. Actually, normal and cancer cells have dimensional similarities. Therefore, cell separation and capturing systems based on the size only result in capturing normal cells along with of cancer cells in the cell capturing stations. Therefore, various techniques have been carried out in the literature in order to separate cells in microfluidic systems.

However, equipment and trained staff will be needed when optic, electric, magnetic and acoustic effects to enable cell array are used in microfluid-based systems.

The US patent document numbered US2012058504 in the prior art enables dielectrophoretic direction and location of an individual cell with various electrode configurations inertly in a container without flow. The cell is moved to a specific location by changing the signals applied to the electrodes and using the same configuration. As an example, fluorescent labeled cells can be relocated to desired locations. Cell sorting under constant flow is not possible in this exemplary document.

In the International Patent document numbered WO2012110922 in the prior art a microfluidic system for full blood count test was developed. In this exemplary document, the flow rates are controlled at each stream with a microfluidic resistance network created to avoid multiple syringe pump use and to avoid the associated costs. Extra channel inlets provided sample thinning and injection of certain chemicals. Under continuous flow, only one cell passes through the measurement electrodes at the same time, and the cell count is realized according to the recorded impedance peaks. In that document, as the cells are moved under continuous flow and are passed through the measurement site only once, the system may not serve for any other purposes than cell count and identification.

The Korean patent document KR20160057280 in the prior art stated that an individual cell was measured by separating the target cell type from other cell types and enabling it to individually pass through the site where the measurement electrodes are located under continuous flow with some alternative methods. Although the cell separation mechanism is not detailed, it is stated that cell count or identification of deformation is possible with the measurements taken on an individual cell, and alternatively the cells can be retained individually in droplets under flow (droplet microfluidics). This patent records the reactions of the cell against chemical stimulants and the temporal changes in the cell structure, as the cells are not retained in a certain site.

The European Patent document numbered EP1645621 in the prior art developed a microfluidic system for target cell type separation. The system separates cells with electrophoresis by virtue of various gels (gel electrophoresis). The system does not include metal electrodes; instead, the electrophoretic force created with the voltage applied to highly conductive liquids or gels is used. Physical barriers which act like filters are also used at the channel outlets.

The Chinese patent document numbered CN103630579 in the prior art comprises a mechanism used to inject cell-containing samples into the microcontainers arranged in a circular array, and to conduct impedance analysis. The cells are not fluidic; they cannot be separated from any cell types, they cannot be individually measured and the samples are required to be placed in the containers one by one with a dropping glass.

However, it is not possible to separate the target cell type from a complex cell group under continuous flow, and to capture the uninterruptedly sorted cells individually in stations and conduct impedance measurements at those stations. As a result, the need for developing the invented microfluidic system herein has risen.

SUMMARY

The objective of this invention is to provide a microfluidic system to separate the target cell type from a complex cell group under continuous flow, and to capture the uninterruptedly sorted cells individually at stations and to conduct impedance measurements at those stations. The individual cell capturing efficiency increases by adjusting hydrodynamic flow resistance in the microchannel and an angled entrance at capturing stations.

BRIEF DESCRIPTION OF THE DRAWINGS

The microfluidic system to achieve the objective of this invention can be seen in the attached figures.

These figures are.

Figure 1:
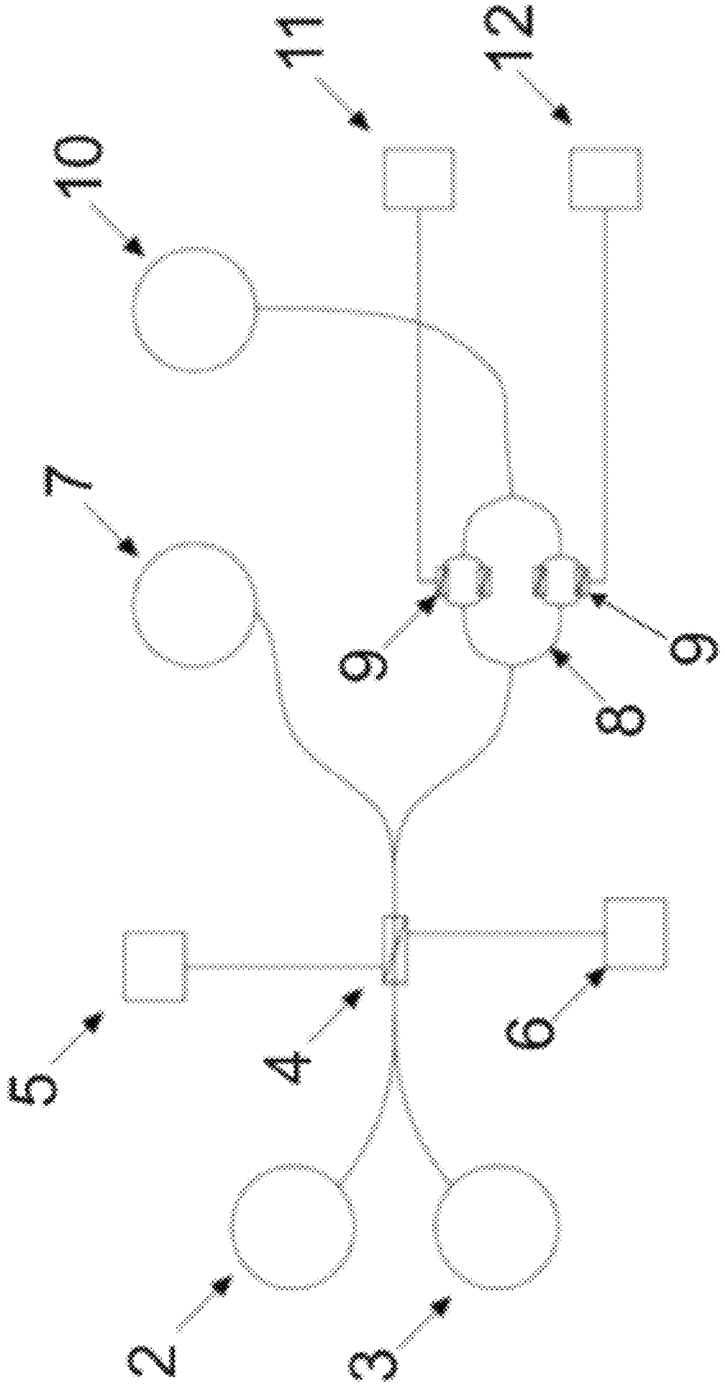
FIG. 1 shows a schematic view of the invented microfluidic system.
Figure 2:
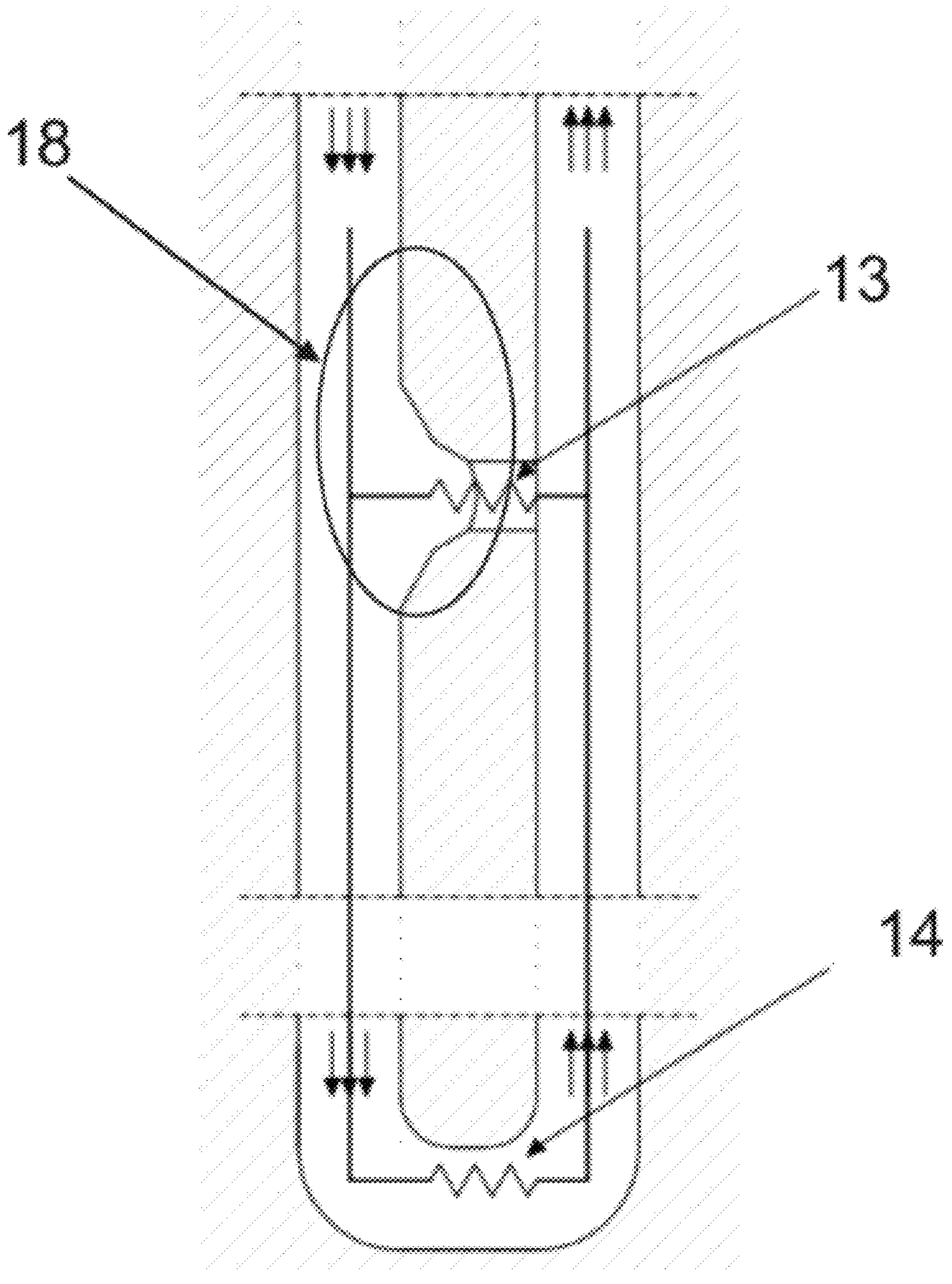
FIG. 2 shows a schematic view of the flow resistances and the capturing station of the invented microfluidic system.
Figure 3:
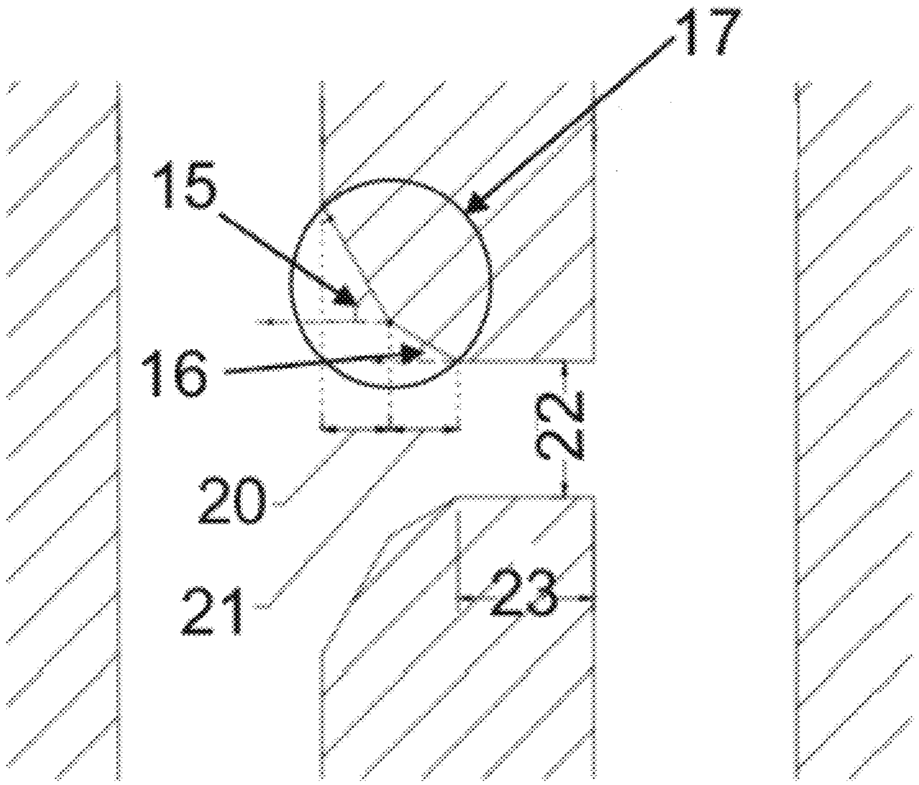
FIG. 3 shows a detailed schematic view of the capturing station of the invented microfluidic system.
Figure 4:
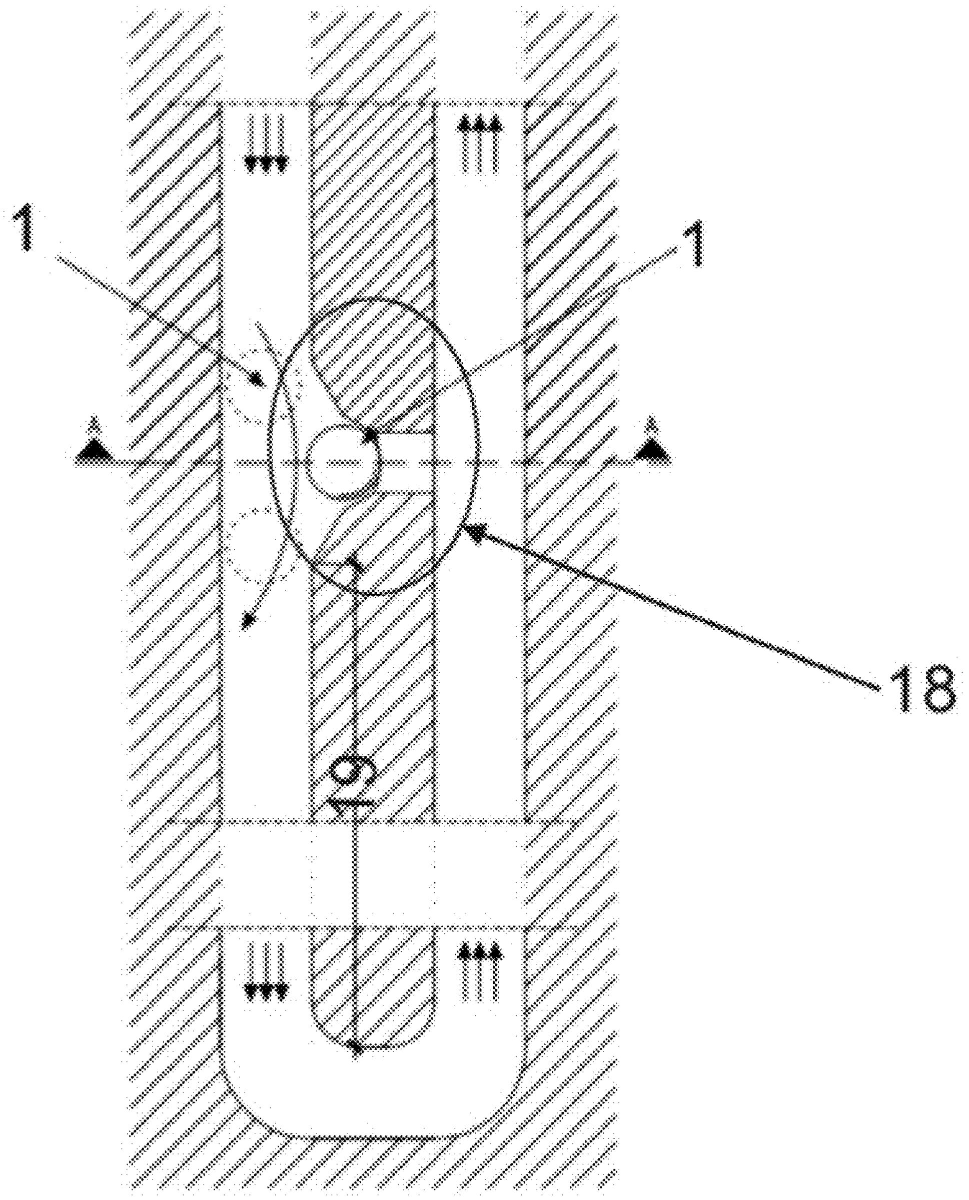
FIG. 4 shows a schematic view of the cell movement through the invented microfluidic system.
Figure 5:
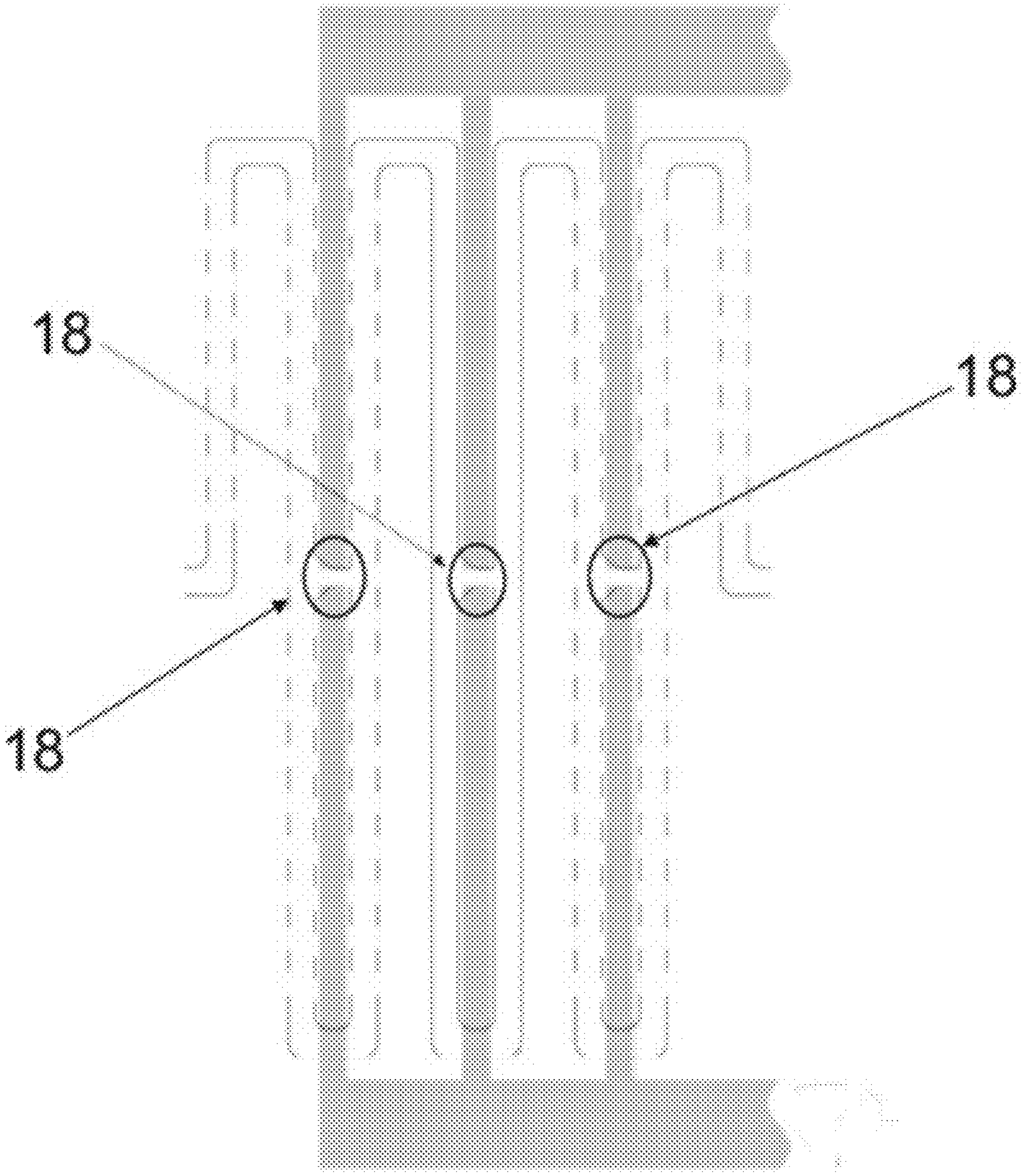
FIG. 5 shows a detailed schematic view of the position of the capturing station in the invented microfluidic system.

The parts on the figures have been numbered one by one, and these numbers refer to the following items:

1. Cell
2. Inlet
3. Buffer liquid inlet
4. Separation site
5. Connection pad I
6. Connection pad II
7. Waste outlet I
8. Flow Line
9. Capturing station
10. Waste outlet II
11. Connection pad III
12. Connection pad IV
13. Flow resistance I
14. Flow resistance II
15. α angle
16. β angle
17. Graded structure
18. Pouch
19. Length I
20. Length II
21. Length III
22. Channel width
23. Length IV

DETAILED DESCRIPTION OF EMBODIMENTS

The invention is a microfluidic system which comprises;

an inlet (2) that enables sample/cell (1) transfer to the microfluidic system, a buffer liquid inlet (3) that is used to concentrate the cells (1) in one half of the microchannel and used as a driving force to prevent spread of cells (1) to the entire channel under flow, a dielectrophoretic separation site (4) having finger electrodes that are placed with a 45° angle to the flow at the lower base of the microchannel that is connected to the inlet (2) and the buffer liquid inlet (3), a waste outlet I (7) through which the cells (1) besides the target cell (1) are to be discharged in connection with the separation zone (4), waste outlet II (10) which is connected with the lines (8) used for moving those non-captured cells (1) away from the channel under flow when the retaining stations (9) are completely full, connection pad III (11) and connection pad IV (12) to which the impedance measurement electrodes are connected and which is located under the individual cell (1) capturing stations (9)

and comprises;

a connection pad I (5) to be used to dielectrophoretically separate the cells (1), which are connected to the separation site (4), a connection pad II (6) for the electrodes to be used for dielectrophoretic separation, during which a signal contrary to the one to be given from the connection pad I (5) is to be given, and which is linked with the separation site (4), capturing stations (9) which are connected to the separation site (4) through the lines (8), and in which the target cells (1) are to be captured individually, hydrodynamic flow resistance I (13) located in the first one of the potential lines (8) which can be followed by the cells (1) while they are travelling to the capturing station (9), hydrodynamic flow resistance II (14) located in the other one of the potential lines (8) which can be followed by the cells (1) while they are travelling to the capturing station (9), a pouch (18) including a gradual structure (17), which consists of an α angle (15) and β angle (16) having a smaller degree than the α angle (15) located inside the capturing station (9).

In the invention, a microfluid-based system was developed to capture individual cells (1). Separation is realized on the basis of the electrical characteristics of the cells (1) to separate the desired cell (1) type from a mixture of different types of cells (1). For this purpose, finger electrodes with a successive array and 45° incline were placed onto the microchannel base. The intended cell (1) type is separated under continuous flow and electricity and it is uninterruptedly transferred to the successive capturing stations (9) on the same system.

Under each capturing station (9), one electrode couple and the impedance information obtained from the individual cell (1) is recorded. The pouches (18) which contain a gradual structure (17) created with the α angle (15) and the β angle (16) which has a lower degree than the α angle (15) in the capturing station (9) were successively placed in the microchannel, and a unique solution that enables to remove other cells (1) from the station under continuous flow after capturing one cell (1) was set forth.

In the invention, the value of the hydrodynamic flow resistance I (13) located at the first one of the potential lines (8) that the cells (1) may follow while entering the capturing station (9) is low at the beginning, however said resistance increases after the individual cell (1) is captured. Consequently, the next cell (1) follows this line as the hydrodynamic flow resistance II (14) is lower. As a result, an individual cell (1) is captured in each capturing station (9).

After the individual cell (1) is captured in the capturing station (9), the next cell (1) moves away from the station with the sweeping effect caused by the pouches (18) that have an increasing resistance on the path of the hydrodynamic flow resistance I (13) and a gradual structure (17) created with the α angle (15) and β angle (16) which has a smaller degree than the α angle (15).

The impedance measurement electrodes in the capturing stations (9) can be connected to the connection pad III (11) and connection pad IV (12); and the same and single result can be obtained from all capturing stations (9). Furthermore, different arrangements can be made by connecting any desired number of microelectrode couples from the capturing station (9) separately to the connection pads.

By taking measurements from a single capturing station (9) simultaneously, the measurements which belong to one cell (1) in the population can be recorded, or collective measurements can be obtained by measuring twenty capturing stations (9) simultaneously. The number of measured captured stations (9) may be reorganized according to the objective of the study.

Identification of the minimum number of singular cells (1) at capturing stations (9) to reflect the characteristics of the population and/or to obtain significant information at a measurable strength.

Depending on the recorded impedance analyses, changes related with the electrical characteristics of the cell (1) that have been captured can theoretically be analyzed depending on the change of impedance to occur after the cell (1) is captured and when there is no cell (1) in the capturing station (9) according to the equivalent circuit model suitably adapted to the measurement system. The impedance data recorded after the drug/chemical is applied on the captured cell (1) and the inferences from the changes in the cell structure (1) can be obtained via the same equivalent circuit model.

The length I (19) may be increased to ensure a higher hydrodynamic flow resistance II (14) in comparison to the flow resistance I (13) at the beginning.

Depending on the sizes of the target cell (1), the length II (20) and length (III) to be preferred for the target cell (1) diameter can be changed according to the cell (1) type.

Depending on the target cell (1) size, at the preferred channel width (22) equal to the cell (1) diameter, in the channel with the flow resistance I (13), a width at which the resistance would decrease but the liquid flow would be minimized only after the cell (1) is captured must be preferred.

As the length IV (23) increases, the resistance in the channel with flow resistance I (13) will also increase; therefore, the resistance at the beginning should be preferred at a lower level than that of the channel of flow resistance II (14).

The individual cell (1) capturing station (9) with measurement electrodes on the system base can be placed at any desired number successively on one channel. Furthermore, multiple channels may be arranged in parallel and the total number of capturing stations (9) may be increased.

Measurement electrodes may be placed to receive signals of an individual cell (1) from one capturing station (9), and they may also be placed to receive one signal from the same line (8) or all lines (8).

The invention claimed is:

1. A microfluidic system comprising:

an inlet, wherein the inlet enables a target sample/cell to transfer to the microfluidic system, a dielectrophoretic separation site having a plurality of finger electrodes, wherein the plurality of finger electrodes are placed with a 45° angle to a flow at a lower base of a microchannel wherein the microchannel is connected to the inlet and a buffer liquid inlet, a waste outlet I wherein cells are discharged through the waste outlet I in connection with the dielectrophoretic separation site, waste outlet II wherein the waste outlet II is connected to a line used for moving a plurality of non-captured cells away from the channel under flow when a plurality of retaining stations are completely full; and a connection pad -I (5) to be used to dielectrophoretically separate the cells, wherein the cells are connected to the dielectrophoretic separation site, a connection pad -II for the plurality of finger electrodes to be used for a dielectrophoretic separation, wherein during the dielectrophoretic separation, a signal contrary to one of the plurality of finger electrodes to be given from the connection pad I is given, wherein the connection pad I is linked with the separation site, a plurality of capturing stations wherein the plurality of capturing stations are connected to the separation site through the line, and wherein the target cell are to be captured individually, a hydrodynamic flow resistance I located in a first potential line wherein the cells moves through the hydrodynamic flow resistance I while the cells are travelling to the plurality of capturing stations, a hydrodynamic flow resistance II located in a second potential line wherein the cells moves through the hydrodynamic flow resistance II while the cells are travelling to the plurality of capturing stations, each of the plurality of capturing stations including a gradual structure, wherein the gradual structure comprises an $\alpha$ angle and $\beta$ angle having a smaller degree than the $\alpha$ angle located inside the plurality of capturing stations.

2. The microfluidic system according to claim 1, wherein the microfluidic system comprises the buffer liquid inlet to concentrate the cells in a half of the microchannel and as a driving force to prevent the spreading of the cells to a entire channel under flow.

3. The microfluidic system according to claim 1, wherein the microfluidic system comprises a connection pad III and a connection pad IV, wherein a plurality of impedance measurement electrodes are connected to the connection pad III and the connection pad IV and the connection pad III and the connection pad IV are located under an individual cell in the plurality of capturing stations.

4. The microfluidic system according to claim 2, wherein the microfluidic system comprises a connection pad III and a connection pad IV, wherein a plurality of impedance measurement electrodes are connected to the connection pad III and the connection pad IV and the connection pad III and the connection pad IV are located under an individual cell in the plurality of capturing stations.

* * * * *